United States Patent [19]

van Rosmalen

[11] Patent Number: 4,638,471
[45] Date of Patent: Jan. 20, 1987

[54] OPTICAL SCANNING UNIT COMPRISING A TRANSLATIONAL-POSITION AND ANGULAR-POSITION DETECTION SYSTEM FOR AN ELECTRO-MAGNETICALLY SUSPENDED OBJECTIVE

[75] Inventor: Gerard E. van Rosmalen, Eindhoven, Netherlands

[73] Assignee: U.S. Philips Corporation, New York, N.Y.

[21] Appl. No.: 769,102

[22] Filed: Aug. 26, 1985

[30] Foreign Application Priority Data

Jun. 10, 1985 [NL] Netherlands .................. 8501665

[51] Int. Cl.⁴ .................. G11B 7/00; G11B 21/10
[52] U.S. Cl. .................................. 369/46; 369/45
[58] Field of Search ........................ 369/43–46, 369/112; 350/6.3, 255; 250/201 DF

[56] References Cited

U.S. PATENT DOCUMENTS

4,561,081 12/1985 Janssen et al. .................. 369/45
4,563,058 1/1986 Yanby .............................. 369/45

Primary Examiner—Aristotelis M. Psitos
Attorney, Agent, or Firm—Robert T. Mayer; Algy Tamoshunas

[57] ABSTRACT

An optical scanning unit is described, which unit comprises a radiation source (1), an objective lens (3) and a translational-position and angular-position detection system for determining the translational position and the angular position of the objective lens within the scanning unit. This system comprises a conical-ring mirror (5) which is centered and fixed relative to the objective lens and a radiation-sensitive detection system (9) which is arranged in the path of the radiation reflected from the mirror and which comprises two detectors which are spaced by an annular strip (12) and are each divided into four quadrants (13–20). The scanning unit further comprises an electromagnetic system comprising an annular permanent magnet (70) around the objective lens and at least six magnet coils (71–76) which are arranged in two axially shifted planes (80, 81).

10 Claims, 7 Drawing Figures

OPTICAL SCANNING UNIT COMPRISING A TRANSLATIONAL-POSITION AND ANGULAR-POSITION DETECTION SYSTEM FOR AN ELECTRO-MAGNETICALLY SUSPENDED OBJECTIVE

The invention relates to an optical scanning unit comprising a radiation source, an objective lens for focussing a radiation beam produced by the radiation source to form a scanning spot on a surface to be scanned, a translational-position and angular-position detection system for detecting the translational positions of the objective lens along th angular positions of said lens about two orthogonal axes which both extend perpendicularly to the chief ray of the radiation beam, and an actuating device for translating and tilting the objective lens in response to the electric control signals supplied by the translational-position and angular-position detection system. The invention also relates to apparatus for reading and/or recording information in an information surface of an optical record carrier.

The term "objective lens" must be interpreted in its widest sense. Such a lens may comprise a plurality of lens element but may alternatively comprise a single lens element having, for example, one or two aspheric surfaces. Alternatively, the objective lens may be, for example, a holographic lens or another lens whose operation is based on diffraction instead of refraction.

U.S. Pat. No. 4,425,043 describes an optical scanning unit for use in an apparatus for reading and/or inscribing an optical record carrier, in which scanning unit the objective lens with its holder is suspended in an electromagnetic system. This system ensures that the objective lens substantially follows the movements of the scanning unit, in other words occupies a substantially fixed position in the scanning unit, without physical contact between this lens and the other element of the scanning unit, in other words the objective lens is floating. As a result of this, the position or the movement of the objective lens cannot be influenced by undesired resonances, which resonances do play a part if the objective lens is suspended in the scanning unit by means of, for example, mechanical or elastic means. Suspending or supporting the objective lens electromagnetically is very beneficial for the stability of the scanning spot formed by the objective lens.

When the objective lens should be capable of following movements or vibrations of the scanning unit steps must be taken to enable the translational position of the objective lens relative to the chief ray of the radiation beam and the angular position of the optical axis of this lens relative to the direction of the chief ray to be detected and these positions to be corrected.

European Patent Application No. 0,070,070, which has been laid open to public inspection, describes some examples of an elctromagnetic suspension system for an objective lens in which the magnet coils of the systems are controlled by translational-position and angular-position signals in such a way that during operation of the apparatus the objective lens is not only kept floating but is also set to the correct translational position and angular position. In order to obtain the control signals necessary for this, a reflecting prism may be arranged on the circumference of the objective lens or its mounting in accordance with the above-mentioned U.S. Pat. No. 4,425,043. This prism forms part of a separate translation-position and angular-position detection system, which further comprises a radiation source and a radiation-sensitive detection system comprising at least for separate detections, the prism reflects the beam emitted by the radiation source to the detection system and splits this beam into two sub-beams which are each received by a separate set of at least two detectors. The radiation-distribution over the two sub-beams and hence the detector output signals are determined by the translational position and the angular position of the prism and, consequently, of the objective lens relative to the first position and orientation of the radiation beam.

The known translational-position and angular-position detection system requires some extra provisions such as an additional radiation source. Moreover, the system may exhibit cross-talk between the various detector signals and hence between the various control loops, which may render the entire translational-position and angular-position detection system unstable. Further, the known translational-position and angular-position detection system can be operative only for a specific position of the prism, viewed in a plane transverse to the optical axis of the objective lens. In the known system it is necessary either to ensure that the objective lens cannot rotate about its own axis or to provide an additional detector for detecting the rotation of the prism about the objective axis so as to enable the position of the prism to be corrected.

It is the object of the present invention to provide a translational-position and angular-position detection system which enables an independent measurement of the two translations and two pivotal movements of the object lens to be made, which requires only a small number of simple provisions in the scanning unit, and which is not influenced by a rotation of the objective lens about its axis. To this end the invention is characterized in that the translational-position and angular-position detection system comprises a conical-ring mirror which is centred and fixed relative to the objective lens and a radiation-sensitive detection system which is arranged in the path of the radiation reflected from the mirror and which comprises two detectors which are spaced by an annular strip and are each divided into four quadrants.

For detecting the translational position and the angular position of the objective lens use is made of that part of the radiation from the radiation source of the apparatus which does not fall within the pupil of the objective lens and does not contribute to the scanning spot, so that it is not necessary to provide a separate radiation source for position-detection purposes. This radiation is reflected by the conical mirror to form an annular radiation spot whose average diameter is in conformity with that of the annular strip of the radiation-sensitive detection system. This system has a simple shape and can be integrated on one substrate. The tilts of the conical mirror and hence of the objective lens about the two axes transverse to the chief ray of the radiation beam and the displacements of the conical mirror along these axes each cause a different displacement of the intensity centre of the radiation distribution over the detection system, so that these displacements and tilts can be detected independently of one another. A rotation of the conical mirror about the chief ray of the beam has no effect on the detector signals because the conical mirror is ring-shaped.

An essential feature of the invention is that the conical-ring mirror has a fixed translation position and angular position relative to the objective lens. An embodiment of the optical scanning unit may be characterized further in that the conical-ring mirror is an element which is connected to the holder of the objective lens.

Another embodiment of the scanning unit is characterized in that the conical-ring mirror is constituted by a bevelled raised edge portion of a lens element of the objective lens, which raised edge portion is provided with a reflecting layer. In this embodiment the raised edge portion of said lens element, which may be the sole element of the object lens, may already be formed during the manufacture of this lens element, so that this raised edge portion merely has to be provided with a reflecting layer.

For reasons of weight and costs an objective lens of an optical scanning unit preferably comprises only one lens element. Such a lens is required to have one or two aspheric refracting surfaces. Manufacturing such a lens element in large quantities at acceptable costs is possible only if use is made of a lens die whose inner surface profile is the negative of the desired profile of the lens surface. By means of such dies it is possible to manufacture lens elements which are entirely made of a transparent plastics. However, it is preferred to use a glass preform on which a plastics in an adequately soft condition is deposited and which is given the required shape by means of a lens die, after which it is allowed to cure. This plastics may be an ultraviolet-curable synthetic resin.

A preferred embodiment of the optical scanning unit, in which the objective lens comprises one lens element in the form of a transparent body whose surface which faces the radiation source is provided with a plastic layer having an aspheric outer profile, is characterized further in that the raised edge portion consists of the said plastics.

The scanning unit may be characterized further in that the detectors of the radiation-sensitive detection system are annular. Since the surface areas of the detectors are now small, these detectors respond rapidly and the translational-position and angular-position detection system is more immune to spurious radiation as a result of, for example, undesired reflections in the scanning unit.

By the use of the translational-position and angular-position detection system in accordance with the invention it is possible to keep an objective lens which is suspended in the magnetic field accurately fixed in its translational and angular position if the scanning unit is provided with actuating means which convert the servo signals supplied by the translational-position and angularposition detection system into displacements and tilts of the objective lens.

Another aspect of the invention therefore relates to a combination of the translational-position and angular-position detection system with an electromagnetic actuating device specifically intended for this purpose. In accordance with this aspect, the scanning unit is characterized in that the actuating device comprises an annular permanent magnet which is fixedly connected to the objective lens and two sets of at least three stationary magnet coils each, the coils of the first set being arranged in a first plane transverse to chief ray of the radiation beam and the coils of the second set being arranged in a second plane parallel to the first plane.

This actuating device also enables the axial position, i.e. the position along the chief ray of the radiation beam, and hence the focussing of the objective lens to be corrected. Such a correction is required when a disc-shaped record carrier is scanned and the axial distance between the scanning device and the point of the information surface being scanned cay vary. The focussing-control signal is supplied by a focussing-error detection system which is already present in a conventional scanning unit, and not by the translational-position and angular-position detection system for the objective lens.

The variations in axial distance between the information surface and the scanning unit may be comparatively large, which means that corrections of the axial position of the objective lens should be possible in a comparatively wide range. A larger displacement of the objective system and the annular magnet out of the axial symmetrical position between the two sets of magnet coils may have the result that, when specific coils are energized in order to obtain a specific displacement or a specific tilt of the objective lens, in addition to the force in the desired direction undesired forces in other directions may occur, because the forces in the undesired directions produced by the magnet coils no longer cancel each other. This may give rise to cross-talk, referred to hereinafter as actuator cross-talk, which differs from the crosstalk between the detector signals mentioned at the beginning of the present description, referred to hereinafter as detector crosstalk.

In order to reduce actuator cross-talk the scanning unit in accordance with the invention may be characterized further in that there is provided an axial-position detection system for detecting the position of the objective lens along the chief ray of the radiation beam and the signal supplied by said detection system is applied to the magnet coil. This ensures that the current through each magnet coil, and hence the force generated by this coil, is corrected for, or weighted with, the actual axial position of the objective lens and the annular magnet relative to the axial centre position midway the two planes of the magnet coils.

A preferred embodiment of the scanning unit is characterized in that the axial-position detection system comprises a signal generator for supplying a first control signal to the first set of magnet coils and a second control signal to the second set of magnet coils, which signals have the same amplitude and frequency but are in phase opposition and cause the objective lens to be tilted periodically about one of the two axes transverse to the chief ray of the radiation beam, and the axial-position detection system further comprises the elements of the translational-position and angular-position detection system for converting the periodic tilting into a periodic signal whose amplitude and phase are representative of the magnetude and the direction of a displacement of the axial centre of the annular magnet out of a plane which is situated midway between the two planes in which the magnet coils are disposed.

The additional detection function is then obtained by means of a minimal number of additional elements and an optimum use is made of provisions which are already present in the scanning unit.

The optical scanning unit is very suitable for use in an apparatus for reading and/or recording information in an information surface of a round disc-shaped record carrier. Such an apparatus may be characterized in that a separating element is arranged between the objective lens and the radiation source for separating the radiation reflected by the conical ring mirror from the radiation emitted by the radiation source.

The radiation which emerges from the opening in the conical ring mirror may be used for the actual scanning of, for example, a disc-shaped record carrier. This record carrier may have a radiation-transmitting or a radiation-reflecting information surface. In the latter case the radiation reflected by the information surface can be directed to a radiation-sensitive information detector via said separating element. This information detector, which may comprise a plurality of sub-detectors, may be arranged at another location than the radiation-sensitive detection system of the translational-position and angular-position detection system. However, preferably a radiation-sensitive detector is arranged inside the annular inner detector of the translational-position and angular-position detection system, for converting the radiation reflected by the information surface into an electric signal. In addition to the information being read, this signal may contain information on the position of the scanning spot relative to an information track of the record carrier.

The invention will now be explained by describing by way of example its use in an apparatus for reading and/or inscribing an optical record carrier. Reference is made to the drawings, in which.

Figure 1:
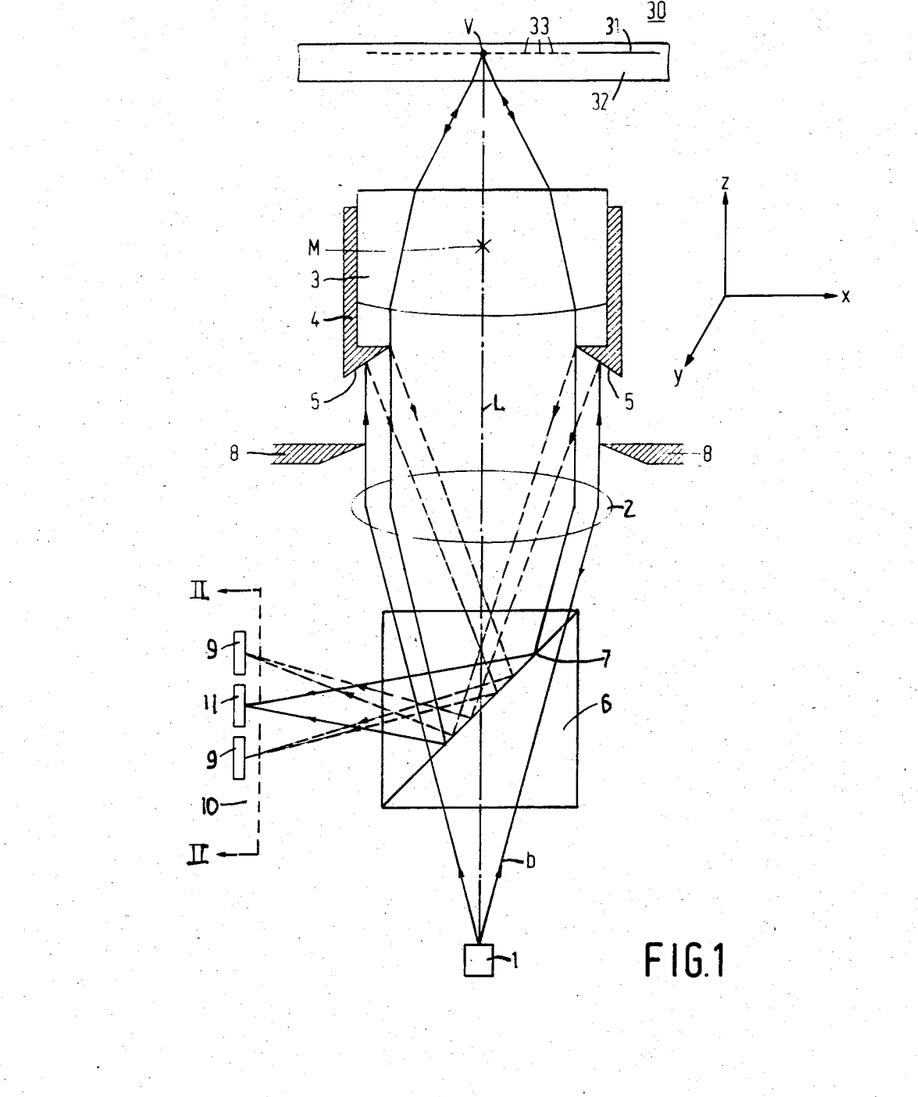
FIG. 1 shows a read apparatus provided with a translational-position and angular-position detection system in accordance with the invention.

The scanning unit shown in FIG. 1 comprises a radiation source 1, for example a diode laser, a collimator lens 2 and an objective lens 3, which is mounted in a holder 4. Both the collimator lens and the objective lens may comprise a plurality of lens elements, but preferably they comprise a single lens element having at least one aspheric refracting surface.

The diverging read beam b emitted by the radiation source is converted into a parallel beam by the collimator lens, which beam fills the aperture of the objective lens 3 in adequate manner. The objective lens focusses the read beam to form a diffraction-limited radiation spot V having a diameter of, for example, 1 μm on the information surface 31 of a disc-shaped record carrier 30, of which a small part is shown in radial cross-section in FIG. 1. The information is arranged in concentric tracks 33 or quasiconcentric tracks which together constitute a spiral track. This information comprises a multitude of optically detectable information areas, not shown, which alternate with intermediate areas. Suitably, the information surface 31 is situated on the upper side of the record carrier, so that the read beam b transverses the transparent substrate 32 of the record carrier before it reaches the information surface. Further, the information surface is suitable radiation-reflecting, so that the read beam is reflected towards the radiation source.

As the record carrier is rotated relative to the scanning unit the beam which is reflected by the information surface is time-modulated in conformity with the sequence of information areas and intermediate areas in an information track to be read. In order to separate the modulated beam from the beam which is emitted by the radiation source a separating element 6 is arranged in the radiation path, which element may be, for example, a semi-transparent mirror or a beam-splitting prism, which may be polarization sensitive or not and whose interface 7 reflects at least a part of the radiation to the radiationsensitive information detector 11. The information detector in the form of for example a photodiode, is suitably arranged in a plane 10 which coincides with the diode-laser exit face which is mirror-inverted relative to the interface 7. The information detector 11 converts the modulated read beam into an electric signal which is processed in known manner to form a signal which is suitable for being displayed, reproduced or processed in another manner depending on the type of information stored in the record carrier. The nature of the information and the processing of the signal from the information detector fall beyond the scope of the present invention and are not discussed in more detail.

In order to enable the objective lens 3 to follow the movements of the scanning unit without any physical contact between this lens and the other elements of the scanning unit the objective lens is suspended in an electromagnetic system which will be described in more detail with reference to FIGS. 5 and 6. This requires the use of a translational-position and angular-position detection system for measuring deviations between the centre M of the objective lens and the chief ray L of the beam b along an X-axis in the plane of the drawing and along an Y-axis perpendicular to the plane of the drawing and tilts of the objective lens about these two axes, so that such deviations from the translational position and the angular position can be eliminated by means of a control system.

The origin of the XYZ axial system shown in the right-hand part of FIG. 1 is in reality situated in the point M, so that the Z-axis coincides with the chief ray l. The direction along this axis may also be referred to as the axial direction. The tilt of the object lens about the X-axis may be represented by the tilting angle $\alpha$ and that about the Y-axis by the tilting angle $\beta$. The X-axis and the Y-axis extend, for example, in the information plane, parallel to the radial direction and the tangential direction respectively.

Figure 2:
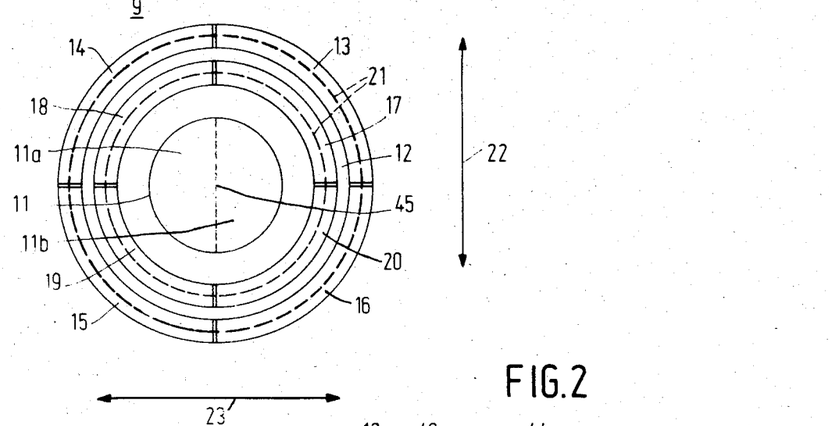
FIG. 2 shows the composite radiation-sensitive detector of this system.

In accordance with the invention the translational-position and angular-position detection system comprises a ring mirror 5 which is fixedly connected to the objective lens which mirror is also conical, i.e. the reflecting surface is disposed at an angle which differs from 90° to the chief ray l, and a radiation-sensitive detection system 9 which is arranged in the plane 10 and which is shown in front view in FIG. 2, i.e. in a view taken on the line II–II' in FIG. 1. The conical ring-mirror 5 reflects that part of the radiation beam b, which falls within the aperture 8 but outside the pupil of the objective lens to the separating element 6, which in its turn reflects a part of the radiation to the detection system 9. On this system an annular radiation spot is formed. The radiation-sensitive detection system 9 comprises two detector rings which are spaced by an intermediate ring 12 and which each comprise four detectors 13, 14, 15, 16 and 17, 18, 19, 20 respectively. The annular radiation spot is represented by the dashed circles 21 in FIG. 2. The average diameter of this radiation spot is equal to that of the intermediate ring 12.

The radiation distribution among the eight detectors depends on the translational position and the angular position of the conical-ring mirror 5 and, consequently, of the objective lens 3. A tilted position about the X-axis or the Y-axis results in the annular radiation spot 21 being shifted in the direction indicated by the arrow 22 and the arrow 23 respectively. A shift of the mirror 5 along the X-axis and Y-axis results in a change of the radiation distribution within the annular radiation spot in such a way that in the case of a displacement along the X-axis the left-hand part of the detection system will receive more radiation or less radiation than the right-hand part, because the portions of the two mirror halves which are situated within the beam, which is stopped down by the aperture 8, are no longer identical. Similarly, the upper part of the detection system will receive more radiation or less radiation than the lower part in the case of a movement along the Y-axis.

If the signals from the detectors 13 to 20 are represented by S followed by the corresponding indices, the displacements along the X-axis and Y-axis and the pivotal movements about these axes may be represented by:

$$S_X=(S_{14}+S_{15}+S_{18}+S_{19})-(S_{13}+S_{16}+S_{17}+S_{20})$$

$$S_Y=(S_{13}+S_{14}+S_{17}+S_{18})-(S_{15}+S_{16}+S_{19}+S_{20})$$

$$S_\alpha=(S_{13}+S_{14}+S_{19}+S_{20})-(S_{17}+S_{18}+S_{15}+S_{16})$$

$$S_\beta=(S_{14}+S_{15}+S_{17}+S_{20})-(S_{18}+S_{19}+S_{13}+S_{16})$$

Figure 3:
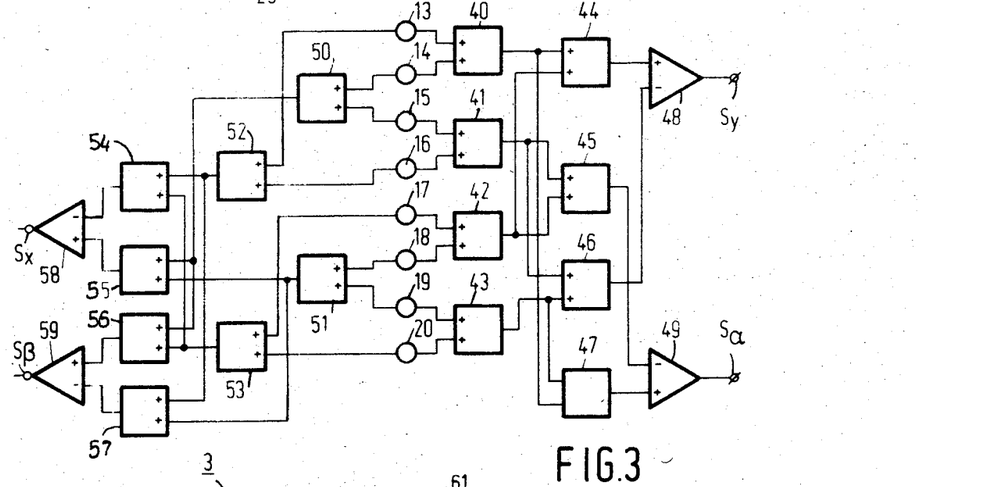
FIG. 3 shows an electronic circuit for processing the signals from this detector.

The individual detector signals can be processed to form composite signals $S_X$, $S_Y$, $S_\alpha$ and $S_\beta$ by means of an electronic circuit, of which an example is shown in FIG. 3. The operation of the circuit, which comprises a number of adder circuits (40 to 47 and 50 to 57) and a number of subtractor circuits (48, 49, 58, 59), is evident from the Figure and requires no further explanation. The composite signals $S_X$, $S_Y$, $S_\alpha$ and $S_\beta$ are independent of each other and exhibit no mutual crosstalk, so that the various displacements and tilting angles can be detected independently of each other. A rotation of the objective lens about the Z-axis does not cause a change of the annular radiation spot 21 and consequently does not influence the detector signals, Displacements of the objective lens along the Z-axis also do not have any influence on the radiation spot 21.

In the scanning unit the signals are employed for driving the magnet coils in an electromagnetic suspension system. In this way the translational position and the angular position of the objective lens are locked to the translational position and the angular position of the composite detector 13–20, which occupies a fixed position within the scanning unit, so that during operation of the read apparatus the objective lens is always controlled to assume the correct translational position and angular position within the scanning unit.

Figure 4:
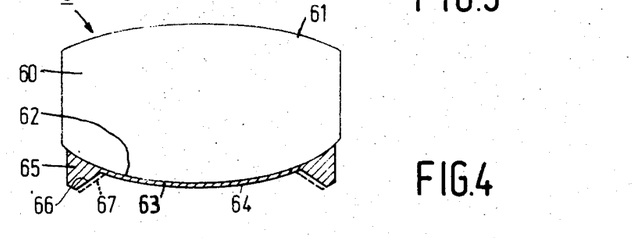
FIG. 4 shows an objective lens with an integrated conical-ring mirror.

A requirement for this is that the conical ring mirror has a fixed translational position and angular position relative to the objective lens. For this purpose, as is shown in FIG. 1, the mirror 5 may form part of the objective holder on mounting 4, within which the objective lens is fixedly arranged. It is alternatively possible to use a separate element for this mirror, which element is secured to the exterior or interior of the objective holder. A very attractive possibility of accurately locking the translational position and the angular position of the annular mirror 5 to those of the objective lens 3 is obtained when this lens is manufactured in accordance with a replica process. This possibilty is illustrated in FIG. 4.

It has been long known that in the scanning unit described the objective lens comprising a plurality of elements may be replaced by an objective lens comprising only one lens element. However, instead of spheric refractive surfaces this lens element should have aspheric refractive surfaces in order to provide an adequate correction for a lens aberration. In order to enable such single objective lenses with intricate surface profiles to be manufactured in large quantities at an acceptable price, it has already been prosposed to employ a transparent body or preform 60 of, for example, glass, having for example two spheric refractive surfaces 61 and 61. A plastics in an adequately soft condition is deposited on one of these surfaces or both surfaces. This plastics material may be a thermosetting plastics, but alternatively it may be an ultraviolet-polymerisable synthetic resin. After the plastics material has been deposited on the surface a die whose surface profile is the negative of the desired lens profile is preferred into the material. Subsequently, the material is cured and the die is removed, so that a lens provided with a plastics layer 53 having an aspheric profile 64 is obtained. Such lenses need not be subjected to any further operation such as polishing.

In accordance with the invention the die by means of which the objective lens is manufactured can be adapted in such a way that at the same time with the aspheric layer 63 a raised edge portion 65 with a bevelled surface 66 is formed. After the manufacture of the objective lens the surface 66 merely has to be provided with a reflecting coating 67, for example by vapour deposition, in order to obtain an objective lens with an integrated conical-ring mirror. The reflecting raised edge portion may be formed on the lens surface which is situated nearest the radiation source but alternatively it may be formed on the other lens surface.

Alternatively, the entire objective lens may be moulded from a transparent plastics by means of dies having the desired profile. The die used for manufacturing a lens surface may have such a recess at its edge that the lens thus manufactured is formed with raised edge portion with a bevelled inner surface. If a glass preform is used the first-mentioned replica lens has the advantage that it is more immune to temperature variations and other environmental influences such as moisture.

It is obvious that the scanning unit may comprise an objective lens comprising a plurality of lens elements and that surface of the last lens which faces the radiation source has an aspheric surface and carries an integrated conical ring mirror. Alternatively, this mirror may be arranged on one of the other lens surfaces.

As is shown in FIG. 1 the information detector 11 may be arranged inside the composite detector of the translational-position and angular-position detection system and may be integrated on one substrate together with said system, using known and very accurate technologies for the manufacture of integrated circuits. The information detector may comprise a single detector which only supplies the signal representing the information stored on the record carrier. Alternatively, the information detector may be divided into sub-detectors which in addition to the information signal also supply control signals, such as a tracking signal.

A tracking signal can be obtained by dividing the detector 11 into two sub-detectors 11a and 11b, as indicated by the broken line 45 in FIG. 2, which line corresponds to the tangential direction on the record carrier 30. The difference between the output signals of the sub-detectors 11a and 11b contain information on the magnitude and the direction of a deviation between the centre of the read spot V and the central axis of an information track to be read. The manner in which a tracking signal can be generated falls beyond the scope of the present invention and will not be described in more detail. By way of example reference is made to U.S. Pat. No. 4,425,043, where in addition to the said method of generating a tracking signal a method of generating a focussing error signal is described.

In the scanning unit in accordance with the invention, it is possible, in analogy with the last-mentioned method to separate a part of the main-beam radiation reflected by the prism 6 from the main beam i.e. the beam which is incident on the detector 11, for example by means of a semitransparent mirror. By means of, for example, a roof prism the part thus separated can be divided into two sub-beams, which sub-beams are incident on three or four radiation-sensitive detectors which are arranged in line transversely of the roof edge of the prism. The focussingerror signal is given by the difference between the sum signal of the two outer detectors and the sum signal of the two inner detectors.

In order to keep the radiation spot V centred on an information track read apparatus comprises a coarse control and a fine control. For coarse control purposes the scanning unit shown in FIG. 1 may be moved bodily in a radial direction relative to the record carrier. For this purpose the elements 1, 2, 3, 6, 9 and 11 may be arranged inside one tubular holder, which is radially moved by means of a pivotal arm or a rectilinearly movable slide. Fine control may be effected, for example, by means of a pivotal mirror, not shown in FIG. 1, or by moving the objective lens over small distance in the X-direction or the radial direction. As described in U.S. Pat. No. 4,423,496 this fine control results in the chief ray 1 of the read beam being displaced relative to the detectors 11a and 11b independently of the deviation between the centre of the radiation spot V and the central axis of a track being read. This introduces an error, referred to as offset, into the tracking signal. As is described in U.S. Pat. No. 4,423,496 this error can be eliminated by correcting the tracking signal obtained by means of the detectors 11a and 11b by a signal which is proportional to the radial position of the objective lens. In a scanning unit according to the invention this signal $S_X$ is already supplied by the translational-position and angular-position detection system, so that unlike the apparatuses in accordance with U.S. Pat. No. 4,423,496 no separate system is required for this purpose.

When an optical record carrier having a radiation-reflecting information surface is read by means of a diode laser use can be made of the feedback effect of such a laser. The beam which is modulated by the information structure is then not separated from the beam emitted by the diode laser but the first-mentioned beam re-enters the diode laser and interferes with the radiation produced in the laser resonant cavity. As a result of this, the beam emitted by the diode laser is modulated in conformity with the information being read. This modulation can be detected by means of a radiation-sensitive detector arranged at the rear of the diode laser, from which radiation emerges which is correlated with the radiation emerging from the front of the diode laser. Another consequence of the feedback effect is that the electrical resistance of the diode laser varies in conformity with the information being read. Detecting this variation is another possibility of reading the information stored in the record carrier.

The translational-position and angular-position detection system in accordance with the invention may also be employed in scanning units using the feedback effect. Such a scanning unit differs from that shown in FIG. 1 in that the separating element 6 is dispensed with, the function of the information detector 11 is performed by the diode laser 1, and the radiation-sensitive detection system 9 for the translational-position and angular-position detection is arranged around the diode laser 1.

Moreover, the invention may be employed in apparatuses for reading optical record carriers in transmission. In such apparatuses the information detector is disposed on another side of the record carrier than the radiation source, in an arrangement as shown in FIG. 1 on the upper side, so that this detector can no longer be integrated with the detection system 9. This detection system may be arranged in the position shown in FIG. 1 or may again be arranged around the diode laser.

In order to maintain the objective lens in the correct X-position and Y-position and to maintain the objective axis parallel to the Z-axis, use may be made of an electromagnetic system comprising a plurality of coils, to which the signals $S_X$, $S_Y$, $S_\alpha$ and $S_\beta$ from the translational-position and angular-position detection system are applied. European Patent Application No. 0,103,929 describes an electromagnetic system in which an objective lens for reading an optical record carrier is moved and tilted in such a way that the radiation spot formed by this objective lens is incident on the information surface at the correct radial and tangential position. In accordance with the invention a similar electromagnetic system may be employed for maintaining the objective lens in the correct translational position and angular positions relative to the radiation-sensitive detection system 8.

Figure 5:
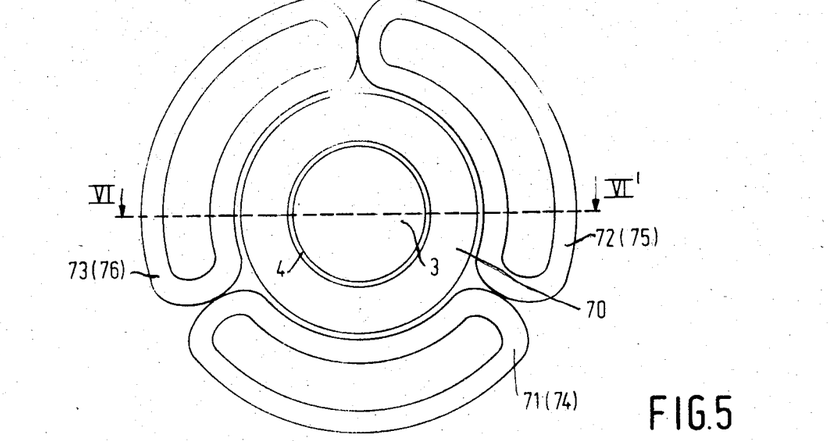
FIG. 5 is a plan view of an example of electro-magnetic suspension system.
Figure 6:
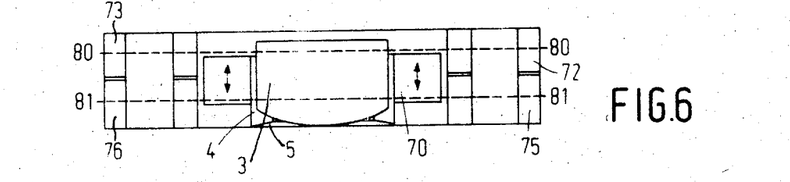
FIG. 6 is a cross-sectional view of this system.

FIG. 5 is a plan view of the electromagnetic system and FIG. 6 is a sectional view of the system taken on the line VI–VI'. In these Figures the numeral 3 denotes the objective lens and 4 its holder. A ring 70 of a permanent magnetic material is secured to this holder. This ring is situated in the magnetic-force field of at least six stationary magnet coils which are arranged in two axially shifted planes. Three magnet coils 71, 72 and 73 are visible in the plan view of FIG. 5. The magnet coils 74, 75 and 76 of the second set, which are situated underneath this first-mentioned set of magnet coils and which are therefore not visible, have the same shape. Suitably, the magnet coils have an arcuate shape in conformity with the three-dimensional field of the permanent magnet 70, so that the Lorentz forces are as large as possible. Instead of three it is possible to provide four magnet coils in each plane, i.e. eight magnet coils in total. For further details on the construction of the electromagnetic system reference is made to European Patent Application No. 0.103,929. Said Application also describes how by applying specific control signals to specific coils displacements in the X-direction or Y-direction or tilts about the X-axis or Y-axis of the objective lens can be obtained and also how the objective lens can be moved in an axial direction. In the table in European Patent Application No. 0,103,929, which indicates through which coils and with which phase currents should be fed in order to obtain a specific displacement or pivotal movement of the objective lens, a current proportional to the signal $S_X$, $S_Y$, $S_\alpha$ or $S_\beta$ should be inserted at the appropriate points of said table for each of the movements indicated therein. The current for the axial displacement of the objective lens is proportional to the focussing-error signal, which is supplied by a conventional focussing-error detection system, for example the system described in U.S. Pat. No. 4,425,043.

For each of the five possible movements of least two magnet coils are driven with signals in phase opposition, so that for a large travel only a small variation of the Lorentz forces occurs. In this electromagnetic system the various drives are correctly isolated from one another, which guarantees a high stability of the five control systems.

When the scanning unit described herein is used for reading a rotating disc-shaped record carrier comparatively large variations in the axial distance between the objective lens and the information surface may occur. These variations may be caused by vibrations in the read apparatus, by obliquity of the record carrier or the axis of rotation, by an oblique position of the information surface in the record carrier, or in particular in the case of large record carriers, by sagging of the record carrier towards the edge. In the case of larger axial displacements of the objective lens in scanning unit in order to provide a correction for these variations, crosstalk may occur between the various actuators, referred to as actuator crosstalk. In accordance with a further aspect of the invention this crosstalk can be eliminated by detecting the axial position of the objective lens in the scanning unit and by correcting the control signals for the X and Y movements and the $\alpha$ and $\beta$ tilts by means of the axisl-position signal thus obtained.

Figure 7:
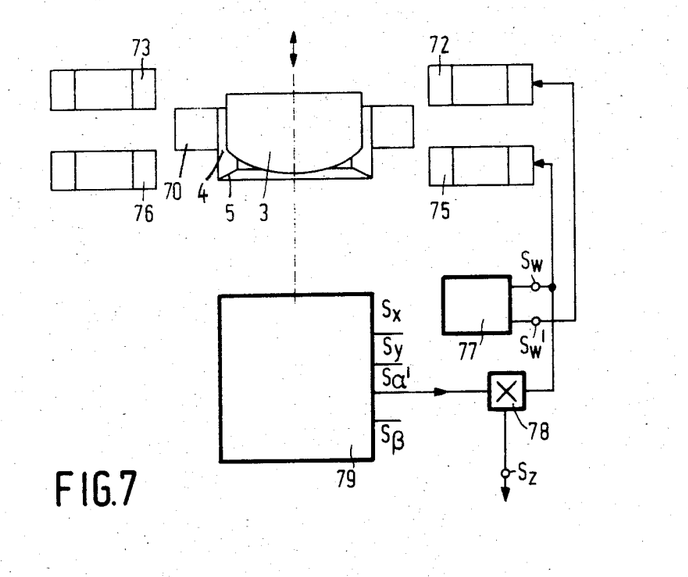
FIG. 7 illustrates how an axial-position signal for the objective lens can be obtained.

This additional controller is illustrated in FIG. 7. In this Figure the block 79 contains all the elements of the scanning unit of FIG. 1, except for the objective lens 3 and the conical-ring mirror 5. Use is made of an oscillator 77 which supplies two 180° phase-shifted periodic signals $S_w$ and $S_w'$ in order to obtain a periodic pivotal movement of the objective lens. One of these signals is applied to the upper array of magnet coils and the second signal to the lower array of magnet coils. Within one magnet-coil array those magnet coils which are situated opposite one another relative to the pivotal axis are driven in phase opposition. These signals produce a periodic tilting, for example about the X-axis of the objective lens 3 with the conical-ring mirror 5, so that the translationalposition and angular-position detection system supplies an additional signal $S_\alpha'$, which is a periodic signal of a specific phase. This phase indicates whether the upper or the lower magnet-coil array exerts the larger force on the annular magnet 70 and the objective lens 3 and consequently whether the objective lens has shifted upwards or downwards relative to the central position between the planes 80 and 81. The amplitude of the signal $S_\alpha'$ is proportional to the magnitude of the deviation from the central position. By comparing the phase of the signal $S_\alpha'$ with that of one of the signals $S_w$, $S_w$ in the phase comparator 78 an axial-position signal $S_Z$ is obtained. This signal is superimposed on the signal $S_X$, $S_Y$, $S_\alpha$ and $S_\beta$, in order to correct the actuators to be energized by means of these signals with respect to the axial position of the objective lens and the annular magnet.

The fact that the invention is described for a read apparatus does not mean that the scope of the invention is limited thereto. Alternatively, the scanning unit in accordance with the invention be employed in apparatuses for recording information in optical record carriers, which apparatuses in principle are of the same construction as the read apparatus but operate with a higher radiation intensity, which intensity is modulated in conformity with the information to be recorded. For this purpose a modulator, for example an acousto-optical modulator, may be arranged in the radiation path between the radiation source 1 and the separating element 6. If the radiation source is a diode laser the radiation emitted by this source may be modulated directly by modulating the electric current fed through the diode laser in conformity with the information to be recorded. Further, the invention may be employed in other optical scanning systems, such as a scanning microscope, and in general in imaging systems comprising small lenses and having a high imaging quality, in which the image field of the lenses may be limited.

What is claimed is:

1. An optical scanning unit comprising a radiation source, an objective lens for focussing a radiation beam produced by the radiation source to form a scanning spot on a surface to be scanned, a translational-position and angular-position detection system for detecting the translational positions of the objective lens along and the angular positions of said lens about two orthogonal axes which both extend perpendicularly to the chief ray of the radiation beam, and an actuating device for translating and tilting the objective lens in response to control signals supplied by the translational-position and angularposition detection system, characterized in that the translation-position and angular-position detection system comprises a conical-ring mirror which is centred and fixed relative to the objective lens and a radiation-sensitive detection system which is arranged in the path of the radiation reflected from the mirror and which comprises two detectors which are spaced by an annular strip and are each divided into four quadrants.

2. An optical scanning unit as claimed in claim 1, characterized in that the conical-ring mirror is an element which is connected to a holder of the objective lens.

3. An optical scanning unit as claimed in claim 1, characterized in that the conical-ring mirror is constituted by a bevelled raised edge portion of a lens element of the objective lens, which raised edge portion is provided with a reflecting layer.

4. An optical scanning unit as claimed in claim 3 in which the objective lens comprises one lens element in the form of a transparent body whose surface which faces the radiation source is provided with a plastics layer having an aspheric outer profile, characterized in that the raised edge portion consists of the said plastics.

5. An optical scanning unit as claimed in claim 1, 2, 3 or 4, characterized in that the detectors of the radiation-sensitive detection system are annular.

6. An optical scanning unit as claimed in claim 1, 2, 3, or 4, characterized in that the actuating device comprises an annular permanent magnet which is fixedly connected to the objective lens and two sets of at least three stationary magnet coils each, the coils of the first set being arranged in a first plane transverse to the chief ray of the radiation beam and the coils of the second set being arranged in a second plane parallel to the first plane.

7. An optical scanning unit as claimed in claims 1, 2, 3 or 4 characterized in that there is provided an axial-position detection system for detecting the position of the objective lens along the chief ray of the radiation beam and the signal supplied by said detection system is applied to the actuating device.

8. An optical scanning unit as claimed in claim 6, characterized in that there is provided an axial-position detection system for detecting the position of the objective lens along the chief ray of the radiation beam, the axial-position detection system comprising a signal generator for supplying a first control signal to the first set of magnet coils, which signals have the same amplitude and frequency but are in phase opposition and cause the objective lens to be tilted periodically about one of the two axes transverse to the chief ray of the radiation beam, and the axial-position detection system further comprises the elements of the translation-position and angular-position detection system for converting the periodic tilting into a periodic signal whose amplitude and phase are representative of the magnitude and the direction of a displacement of the axial centre of the annular magnet out of a plane which is situated midway between the two planes in which the magnet coils are disposed.

9. An apparatus for reading information from and/or recording information on an information surface of a record carrier, said apparatus comprising means for producing a beam of radiation, an objective lens mounted for translational movement and angular movement along two orthogonal axis for focussing said radiation beam along a chief ray so as to form a scanning spot on said information surface, means for detecting the translational positions of said objective lens along and the angular positions of said objective lens about said two orthogonal axis both of which are perpendicular to the chief ray of said radiation beam, said detection means including an annular mirror which is centered about and fixed to said objective lens for movement therewith, said annular mirror being arranged relative to said objective lens so as to reflect back a portion of said radiation traveling towards said objective lens, and a detection system comprising a pair of radiation sensitive detectors spaced from each other by an annular strip, each of said detectors being divided into four quadrants, and means for separating said radiation reflected by said annular mirror from the radiation traveling towards said objective lens, said separating means being arranged relative to said detection system and said annular mirror so that said reflected radiation is directed to said detection system.

10. An apparatus as claimed in claim 9 wherein said detectors are annular and concentric, and including a further radiation sensitive detector, arranged inside the inner detector of said pair of detectors, for converting radiation reflected by said information surface into an electrical signal.

* * * * *

UNITED STATES PATENT AND TRADEMARK OFFICE
CERTIFICATE OF CORRECTION

PATENT NO. : 4,638,471
DATED : January 20, 1987
INVENTOR(S) : Gerard E. van Rosmalen It is certified that error appears in the above-identified patent and that said Letters Patent is hereby corrected as shown below:

IN THE CLAIMS

Claim 8, line 7   after "coils," insert --and a second control signal to the second set of magnetic coils,--

Signed and Sealed this

Fifteenth Day of November, 1988

Attest:

DONALD J. QUIGG

Attesting Officer   Commissioner of Patents and Trademarks